(12) United States Patent
Toomey

(10) Patent No.: US 7,593,946 B2
(45) Date of Patent: *Sep. 22, 2009

(54) LABOR MARKET INFORMATION ANALYZER FOR RESEARCHERS, EMPLOYERS, STAFF AND OTHERS

(75) Inventor: Paul Toomey, Palm Harbor, FL (US)

(73) Assignee: Geographic Solutions, Inc., Palm Harbor, FL (US)

( * ) Notice: Subject to any disclaimer, the term of this patent is extended or adjusted under 35 U.S.C. 154(b) by 48 days.

This patent is subject to a terminal disclaimer.

(21) Appl. No.: 11/400,080

(22) Filed: Apr. 8, 2006

(65) Prior Publication Data

US 2006/0195346 A1    Aug. 31, 2006

Related U.S. Application Data

(63) Continuation-in-part of application No. 10/000,754, filed on Nov. 2, 2001, now Pat. No. 7,054,864.

(51) Int. Cl.
*G06F 17/30* (2006.01)
(52) U.S. Cl. .......................................... 707/10; 705/10
(58) Field of Classification Search ..................... 707/9, 707/10, 100, 101, 102, 104.1, 202, 205; 709/201, 709/203, 217, 219; 705/1, 7, 8, 10; 711/100, 711/111, 161, 162
See application file for complete search history.

(56) References Cited

U.S. PATENT DOCUMENTS

| | | | |
|---|---|---|---|
| 5,416,694 A | 5/1995 | Parrish et al. | |
| 6,073,107 A * | 6/2000 | Minkiewicz et al. | 705/7 |
| 6,213,780 B1 | 4/2001 | Ho et al. | |
| 6,587,832 B1 | 7/2003 | Beck et al. | |
| 6,671,687 B1 * | 12/2003 | Pederson et al. | 707/9 |
| 6,889,227 B1 * | 5/2005 | Hamilton | 707/102 |
| 6,938,041 B1 * | 8/2005 | Brandow et al. | 707/10 |
| 7,007,023 B2 * | 2/2006 | Huynh et al. | 707/8 |
| 7,054,864 B1 * | 5/2006 | Toomey | 707/10 |
| 2001/0032207 A1 * | 10/2001 | Hartley et al. | 707/102 |
| 2002/0016730 A1 | 2/2002 | Foulger et al. | |
| 2002/0123922 A1 | 9/2002 | Poage et al. | |
| 2002/0198760 A1 | 12/2002 | Carpenter et al. | |
| 2006/0195346 A1 * | 8/2006 | Tommey | 705/7 |

OTHER PUBLICATIONS

Walker, Free-Market Computing and the Global Economic Infrastructure, Parallel & Distributed Technology: Systems & Applications, IEEE vol. 4, Issue 3, Fall 1996 pp. 60-62.*
Narayan et al., a Market-Based Economic Model for Multi-Media Object Storage and Distribution, Multi-Media Database Management Systems, 1995, Proceedings, International Workshop on Aug. 28-30, 1995, pp. 118-125.*

* cited by examiner

*Primary Examiner*—Greta L Robinson
(74) *Attorney, Agent, or Firm*—Larson & Larson PA; Frank Liebenow

(57) ABSTRACT

A computerized information system for analyzing labor market information consisting of a server having a plurality of categorizing and processing services for researchers, employers, staff and the like, a database of standard and proprietary format data and optional stored procedures operatively coupled with the server, and a plurality of input/output client devices operatively coupled with the server.

23 Claims, 10 Drawing Sheets

System Architecture Detail

Categorizing Component Detail ~ 16

| Area Profile ~ 20 |
|---|
| History or Background ~ 20A |
| Population ~ 20B |
| Income ~ 20C |
| Labor Force Statistics ~ 20D |
| Unemployment Insurance Claimants ~ 20E |
| Unemployment Wages ~ 20F |

| Economic Indicators ~ 22 |
|---|
| Building Permits ~ 22A |
| Tax Revenue ~ 22B |
| Property Values ~ 22C |
| Retail Sales ~ 22D |
| Inflation and Price Index ~ 22E |

| Education ~ 24 |
|---|
| Education and Training Programs ~ 24A |
| Education and Training Providers ~ 24B |
| Education and Training Program Completers ~ 24C |

| Employer ~ 26 |
|---|
| Employer Listing by Industry ~ 26A |
| Employer Listing by Occupation ~ 26B |

| Income and Wages ~ 28 |
|---|
| Income ~ 28A |
| Occupation Wages ~ 28B |
| Covered Employment Wages ~ 28C |
| U.S. Census Labor Force ~ 28D |

| Industry ~ 30 |
|---|
| Current Employment Statistics ~ 30A |
| Covered Employment Wages ~ 30B |
| Industry Employment and Projections ~ 30C |
| Staffing Patterns ~ 30D |

| Labor Force ~ 32 |
|---|
| Labor Force Employment and Unemployment ~ 32A |
| Unemployment Insurance Claimants ~ 32B |
| Labor Supply and Demand ~ 32C |
| Education and Training Completers ~ 32D |
| Employment Service Job Openings and Applicants ~ 32E |
| U.S. Census Commuting Patterns ~ 32F |

| Occupation ~ 34 |
|---|
| Occupation Wages ~ 34A |
| Occupation Employment and Projections ~ 34B |
| Unemployment Insurance Claimants ~ 34C |
| Labor Supply and Demand ~ 34D |
| Occupational Employment by Industry ~ 34E |
| Licensed Occupations ~ 34F |
| Employment Service Job Openings and Applicants ~ 34G |

| Population and Census ~ 36 |
|---|
| Population ~ 36A |
| Income ~ 36B |
| Occupation by Race and Gender ~ 36C |
| U.S. Census Labor Force ~ 36D |

Fig. 4

Processing Component Detail — 20F

| Access Control — 40 | Geography — 58 |
|---|---|
| Restrict Access to Data Sets — 40A | National — 58A |
| Restrict Access to Display Options — 40B | State — 58B |
| Automated Data — 42 | County — 58C |
| From Broader Geography — 42A | Metropolitan Statistical Areas — 58D |
| From Broader Timeframe — 42B | Wage Region — 58E |
| From Broader User-Specified Criteria — 42C | Planning Region — 58F |
| | Other Statistical Area — 58G |
| Cross-Reference — 44 | Staff-Defined Geographies — 58H |
| Related Industry Data Set — 44A | Grouping — 60 |
| Related Occupation Data Set — 44B | Grouping Attributes and Data Sets — 60A |
| Related Education Data Set — 44C | Ungrouping Attributes and Data Sets — 60B |
| De-Normalization — 46 | Income — 62 |
| Consistent Record Naming — 46A | Type of Income — 62A |
| Demographic — 48 | Search — 64 |
| Ethnicity — 48A | Find Data Set by Keyword — 64C |
| Gender — 48B | State Control — 66 |
| Other Demographic Data — 48C | Maintain All User-Selected State Parameters Across Data Categories — 66C |
| Depth-of-Access — 50 | |
| Drill Down through Data Sets — 50A | Maintain Partial User-Selected State Parameters Across Data Categories — 66B |
| Drill Up through Data Sets — 50B | |
| Economic Projections — 52 | Timeframe — 68 |
| Future Projections of Appropriate Data — 52A | Year — 68A |
| Education — 54 | Quarter — 68B |
| Type of Educational Institution — 54A | Month — 68C |
| Educational Programs — 54B | Other Date Range — 68D |
| Educational Program Completers — 54C | User Interface — 70 |
| Export — 56 | Select Data Set — 70A |
| Save Data Set to Spreadsheet Format — 56A | Display Data Set — 70B |
| Save Data Set to Delimited Text — 56B | Manipulate Data Set — 70C |

Fig. 5

LABOR MARKET INFORMATION ANALYZER FOR RESEARCHERS, EMPLOYERS, STAFF AND OTHERS

CROSS-REFERENCE TO RELATED APPLICATION

This is a continuation-in-part application to U.S. patent application Ser. No. 10/000,754, filed Nov. 2, 2001, now U.S. Pat. No. 7,054,864 B1, the disclosure of which is herein incorporated by reference.

BACKGROUND OF THE INVENTION

1. Field of the Invention

The present invention relates to a computerized information system for analyzing labor market information and more particularly pertains to providing researchers, employers, staff, and the like with access through a single user-friendly interface to self-service industry, occupation, and education information.

2. Description of the Prior Art

The ability to use the Internet or to use computers on a network to search databases for labor market information, or to request such information from government agencies, are known in the art. However, no single method or system currently provides a user-friendly self-service system that provides access to a comprehensive array of labor market information for researchers, employers, staff, and others, via the Internet or on a computer. The present invention fulfills some of the requirements for compliance with The Workforce Investment Act (WIA) of Aug. 7, 1998.

Labor market information managed by the U.S. Department of Labor's Employment and Training Administration is stored in the America's Labor Market Information System (ALMIS) database structure. Systems to access this standard database structure are known in the art. The present invention complies with the ALMIS database structure for all applicable information. As such the system is able to share industry, occupation, and education data available from federal, state, and local agencies throughout the United States.

While these devices fulfill their respective, particular objectives and requirements, the aforementioned patents do not describe computerized information system for analyzing labor market information that provide researchers, employers, staff, and others with access though a single user-friendly interface to self-service industry, occupation, and education information.

In this respect, the computerized information system for analyzing labor market information according to the present invention substantially departs from the conventional concepts and designs of the prior art, and in doing so provides an apparatus primarily developed for the purpose of providing researchers, employers, staff, and the like with user-friendly access through a single interface to self-service industry, occupation, and education information.

Therefore, it can be appreciated that there exists a continuing need for a new and improved computerized information system for analyzing labor market information which can be used by researchers, employers, staff, and the like through a single user-friendly interface to self-service industry, occupation, and education information. In this regard, the present invention substantially fulfills this need.

SUMMARY OF THE INVENTION

In view of the foregoing disadvantages inherent in the known types of existing methods of analyzing labor market information, the present invention provides an improved computerized information system for analyzing labor market information. As such, the general purpose of the present invention, which will be described subsequently in greater detail, is to provide a new and improved computerized information system for analyzing labor market information and method which has all the advantages of pre-existing methods and none of the disadvantages.

To attain this, the present invention essentially comprises a computerized information system for analyzing labor market information by researchers, employers, staff, and the like, and allowing staff to manage and administer the system, providing researchers, employers, staff, and the like with access through a single interface to self-service industry, occupation, and education information, the system comprising in combination: a server having a plurality of analysis services including categorizing and processing, the categorizing services including a plurality of software components providing area profile, economic indicators, education, employer, population and census, income and wages, industry, labor force, occupation, and economic indicators, the processing services including a plurality of software components providing access control, automated data, cross-reference, de-normalization, demographic, depth-of-access, export, geography, grouping, income, education, economic projections, search, state control, timeframe, and user interface. The categorizing components comprising the education category including a plurality of software components providing education and training programs, education and training providers, and education and training program completers, the employer category including a plurality of software components providing employer listing by industry, and employer listing by occupation, the population and census category including a plurality of software components providing population, income, occupation by race and gender, and U.S. Census labor force, the income and wage category including a plurality of software components providing income, occupation wages, and covered employment wages, the industry category including a plurality of software components providing current employment statistics, covered employment and wages, industry employment and projections, and staffing patterns, the labor force category including a plurality of software components providing labor force employment and unemployment, unemployment insurance claimants, labor supply and demand, education and training completers, employment service job openings and applicants, and U.S. Census commuting patterns, the occupation category including a plurality of software components providing occupation wages, occupation employment and projections, unemployment insurance claimants, labor force supply and demand, occupational employment by industry, licensed occupations, and employment service job openings and applicants, the area profile category including a plurality of software components providing history or background, population, income, labor force statistics, unemployment insurance claimants, and unemployment wages, the economic indicators category including a plurality of software components providing building permits, tax revenues, property values, retail sales, and an inflation and price index. The processing components comprising the user interface component for selecting, displaying, and manipulating data sets, the export component for saving data sets in spreadsheet format or delimited text format, the de-normalization component for consistent record naming regardless of the original data format or coding, the grouping component for grouping and ungrouping of attributes and data sets, the depth-of-access component for drilling up and drilling down through data sets, the access control component for restricting public access to data sets and display options, the geography component for setting location to national, state, county, metropolitan statistical area, wage region, planning region, other statistical areas, and staff-defined geographies, the timeframe component for setting date ranges of year, quarter, month, or other date range, the demographic component for sorting appropriate data by demographic criteria, the income component for sorting appropriate data by type of income, the education component for sorting education providers by type of institution, the search component for finding data sets by keyword, the state control component for maintaining all or partial user-selected state parameters across data categories, the economic indicators component for viewing appropriate data sets projected into the future, cross-reference components for viewing related data sets between industry, occupation, and education data types, automated data components that return a data set from a broader level of geography, timeframe, or user-specified criteria where appropriate. A plurality of input/output client devices operatively coupled with the server for the two-way communication of information between the server and the client, the plurality of devices allowing access from researchers, employers, staff, and the like providing access through a single user-friendly interface to self-service industry, occupation, and education information.

In another aspect of the present invention, a labor market information analyzer system for user manipulation of labor market data is described having a server with components for categorizing data by at least two categories selected from the group consisting of education, employer, population and census, income and wage, industry, labor force, occupation, area profile and economic indicators. A database of standard data and proprietary data operatively coupled to the server and stores the labor market data. Input/output client devices are operatively coupled to the server for accessing the categorized data.

In another aspect of the present invention, a labor market information analyzer system for user manipulation of labor market data is described having a server with components for categorizing data by at least two categories selected from the group consisting of education, employer, population and census, income and wage, industry, labor force, occupation, area profile and economic indicators and access to both standard data and proprietary data operatively coupled to the server. Further, input/output client devices are coupled to the server to provide the categorized data. At least tow categories are needed to provide more complete views of the labor market in a given area or sector.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved computerized information system for analyzing labor market information which has all of the advantages of pre-existing methods of analyzing labor market information and none of the disadvantages.

It is another object of the present invention to provide a new and improved computerized information system for analyzing labor market information which may be easily and efficiently manufactured and marketed.

It is further object of the present invention to provide a new and improved computerized information system for analyzing labor market information which is of durable and reliable constructions.

An even further object of the present invention is to provide a new and improved computerized information system for analyzing labor market information which is susceptible of a low cost of manufacture with regard to both materials and labor, and which accordingly is then susceptible of low prices of sale to the consuming public, thereby making such computerized information system for analyzing labor market information economically available to the buying public.

Even still another object of the present invention is to provide a computerized information system for analyzing labor market information that provides researchers, employers, staff, and the like with user-friendly access through a single interface to self-service industry, occupation, and education information.

Lastly, it is an object of the present invention to provide a new and improved computerized information system for analyzing labor market information comprising a server having a plurality of services for researchers, employers, staff, and the like and a database of information in standard and proprietary formats, and a plurality of input/output client devices.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is the categorizing component detail comprising all the components used to categorize labor market information.

FIG. 5 is the processing component detail comprising all the components used to process labor market information.

The same reference numerals refer to the same parts throughout the various Figures.

DETAILED DESCRIPTION OF THE INVENTION

Figure 1:
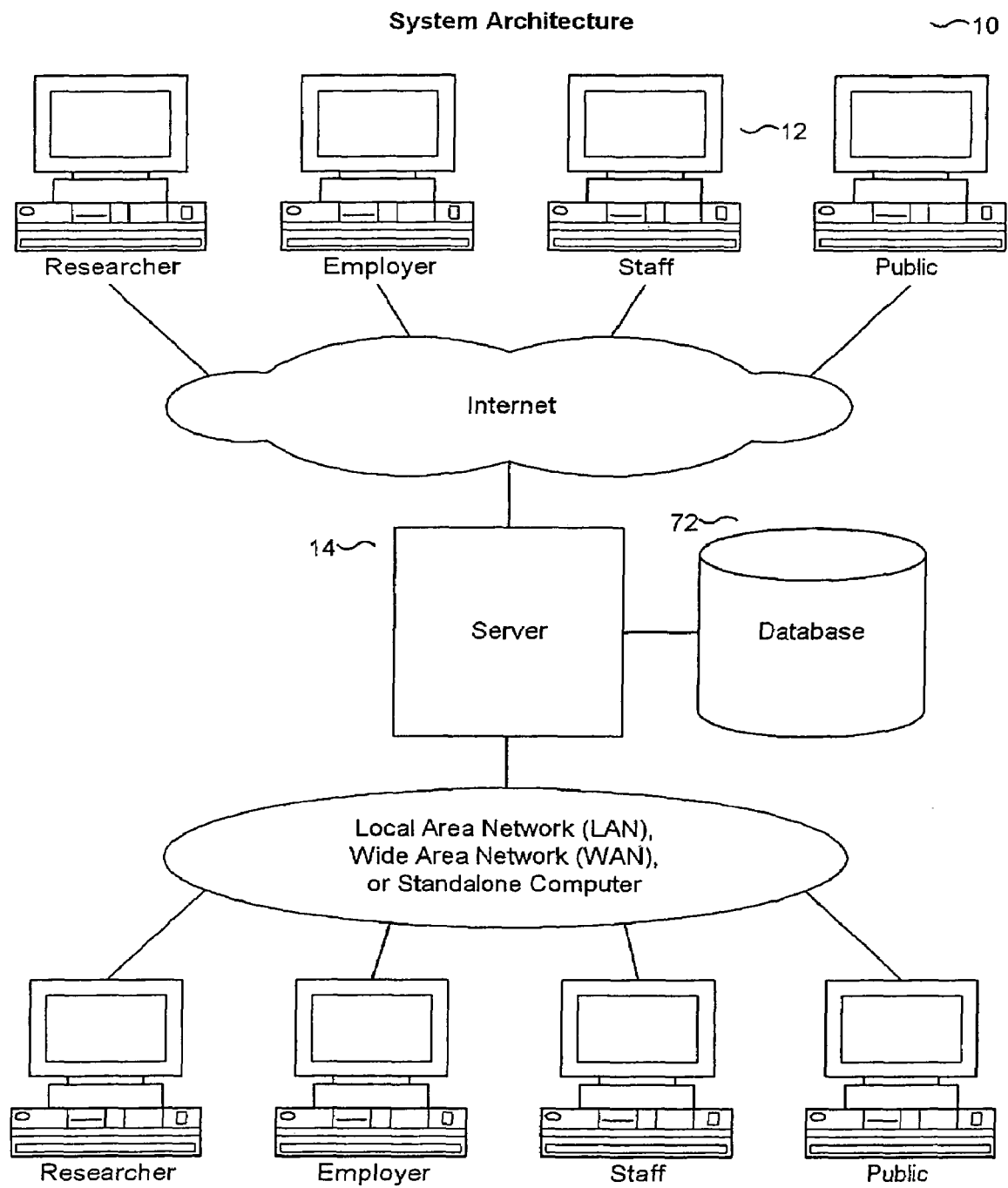
FIG. 1 is the system architecture of the computerized information system for analyzing labor market information.
Figure 2:
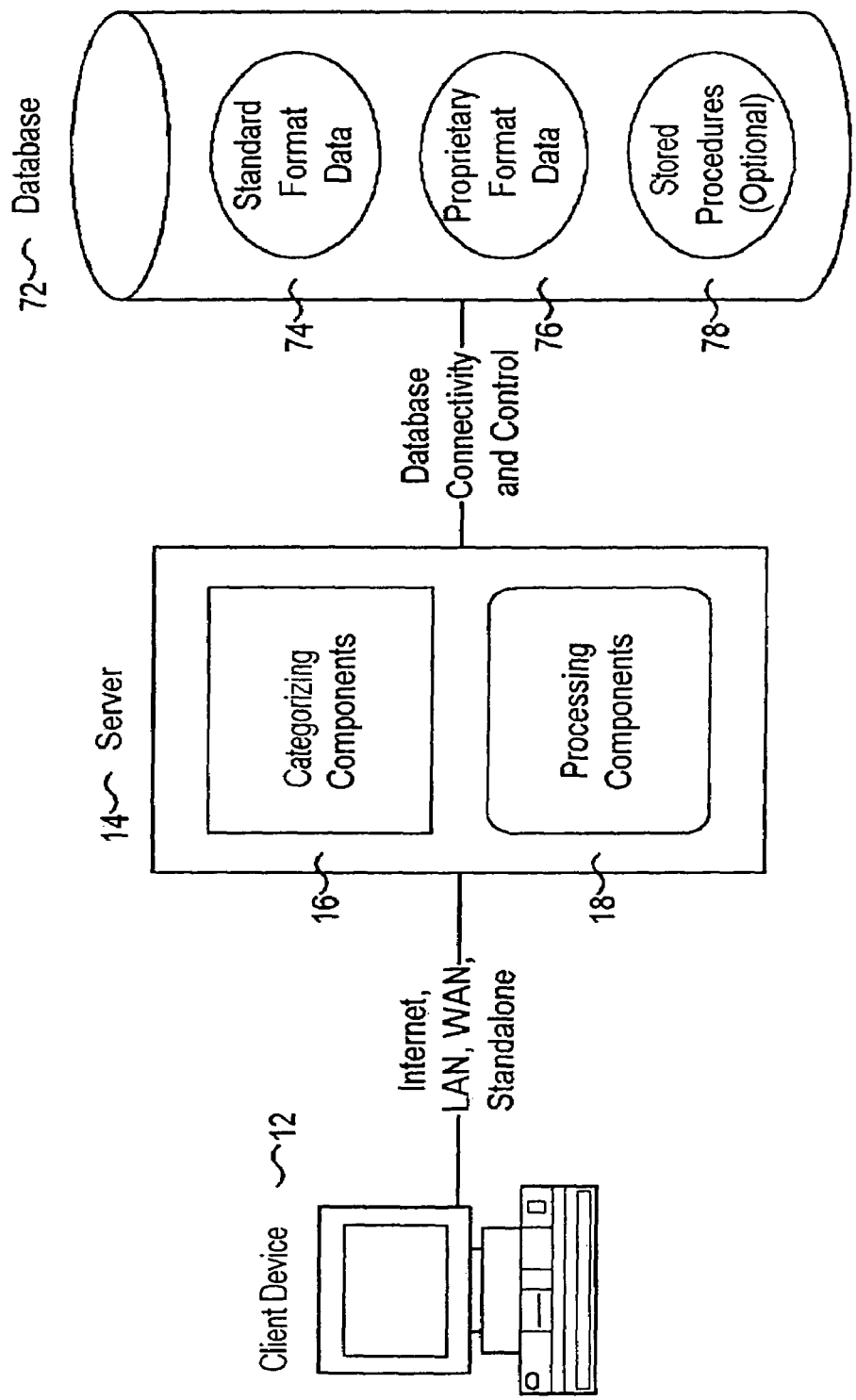
FIG. 2 is a more detailed view of the system architecture showing the client, server, and database.
Figure 3:
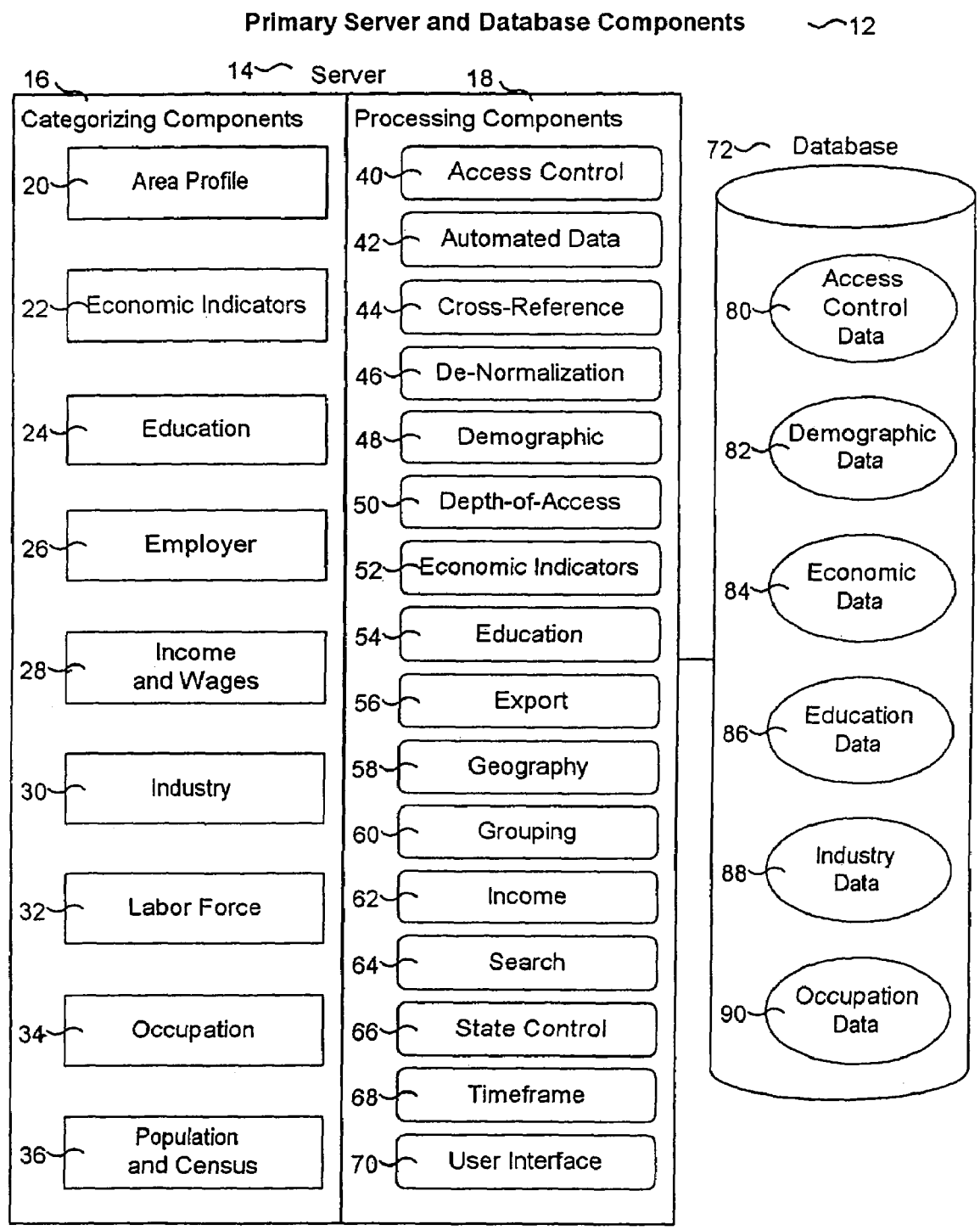
FIG. 3 are the primary server and database components comprising categorizing and processing services, and data access.
Figure 6:
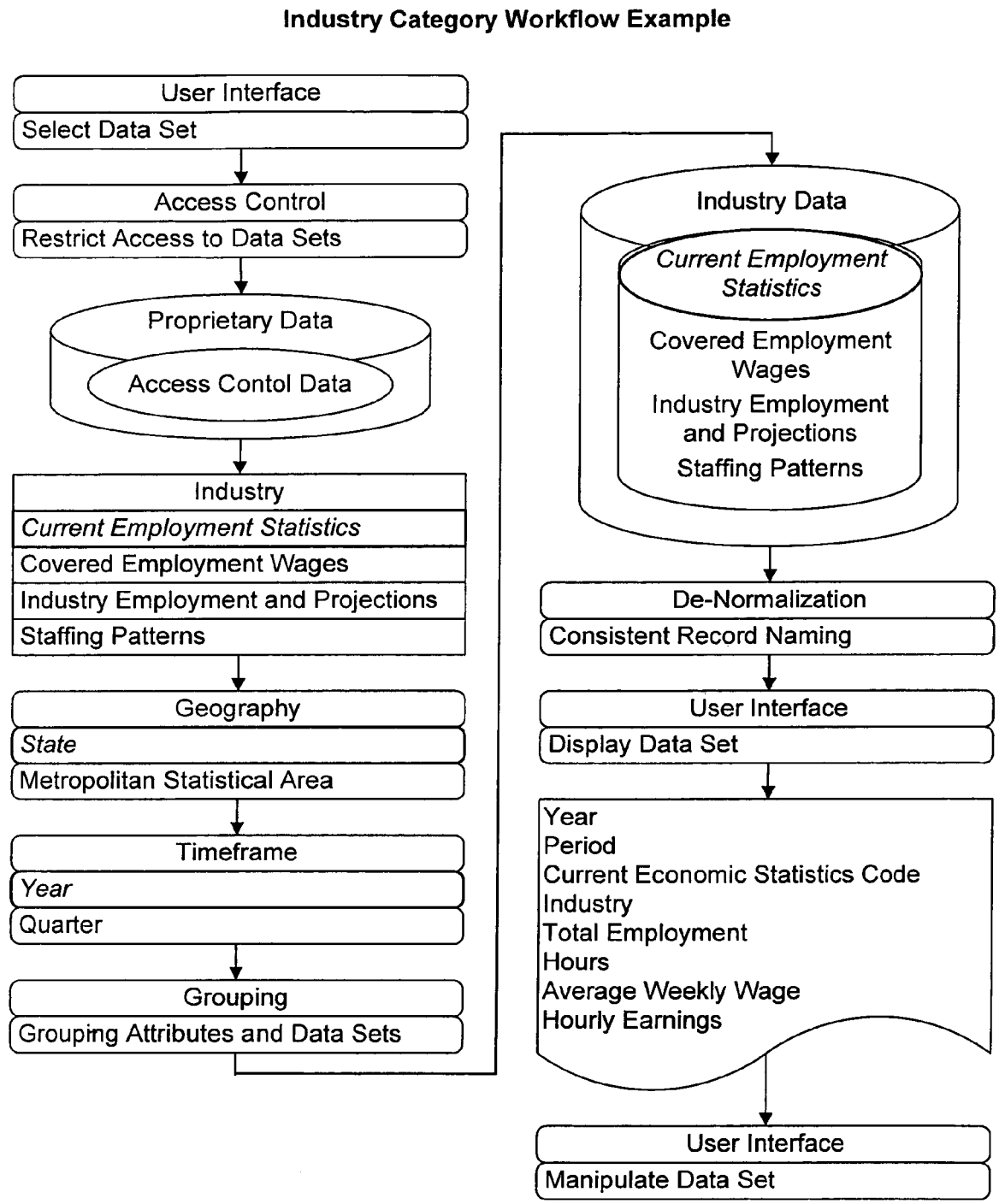
FIG. 6 is an industry category workflow example showing an operative description of analyzing labor market information.
Figure 7:
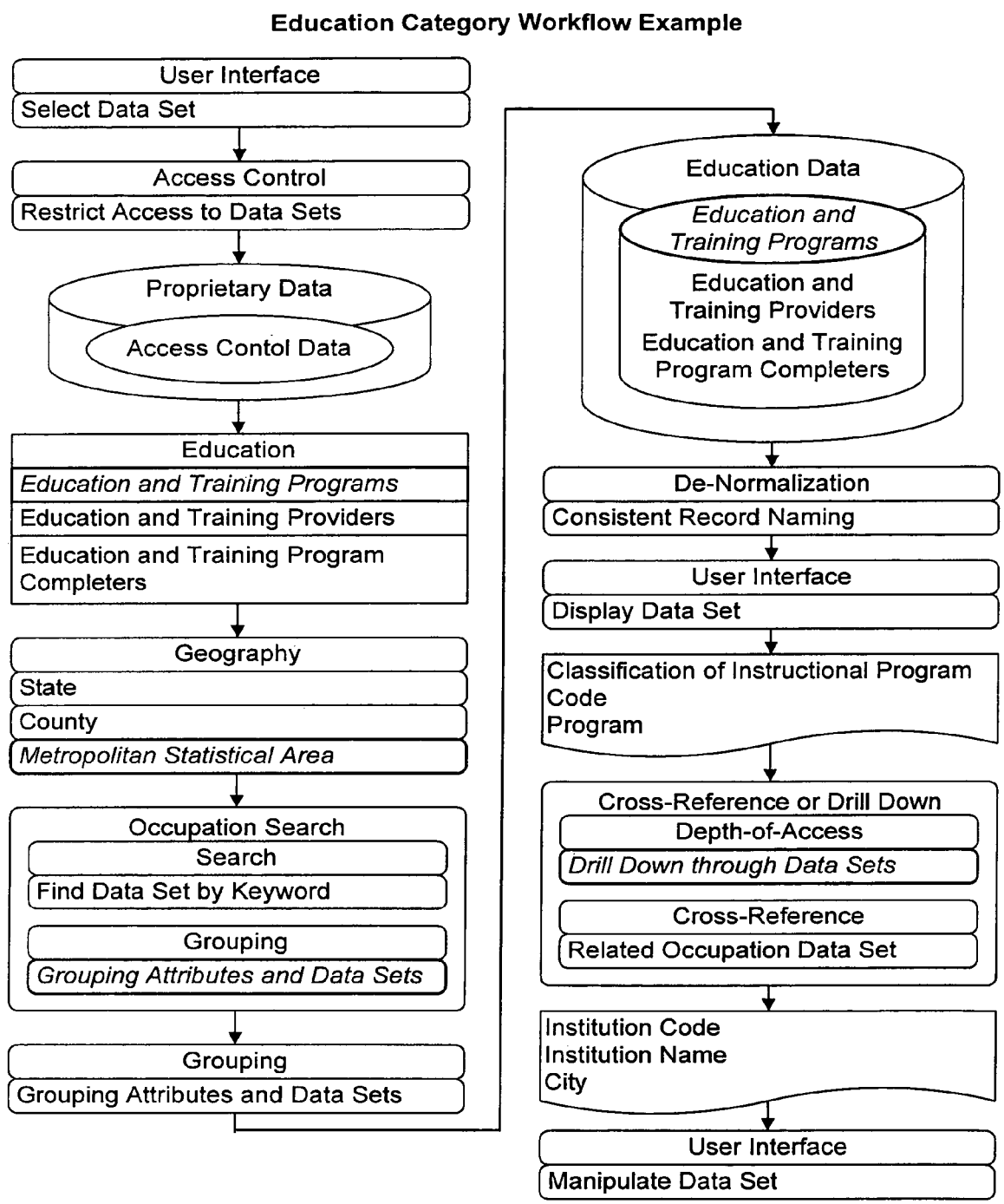
FIG. 7 is an education category workflow example showing an operative description of analyzing labor market information.
Figure 8:
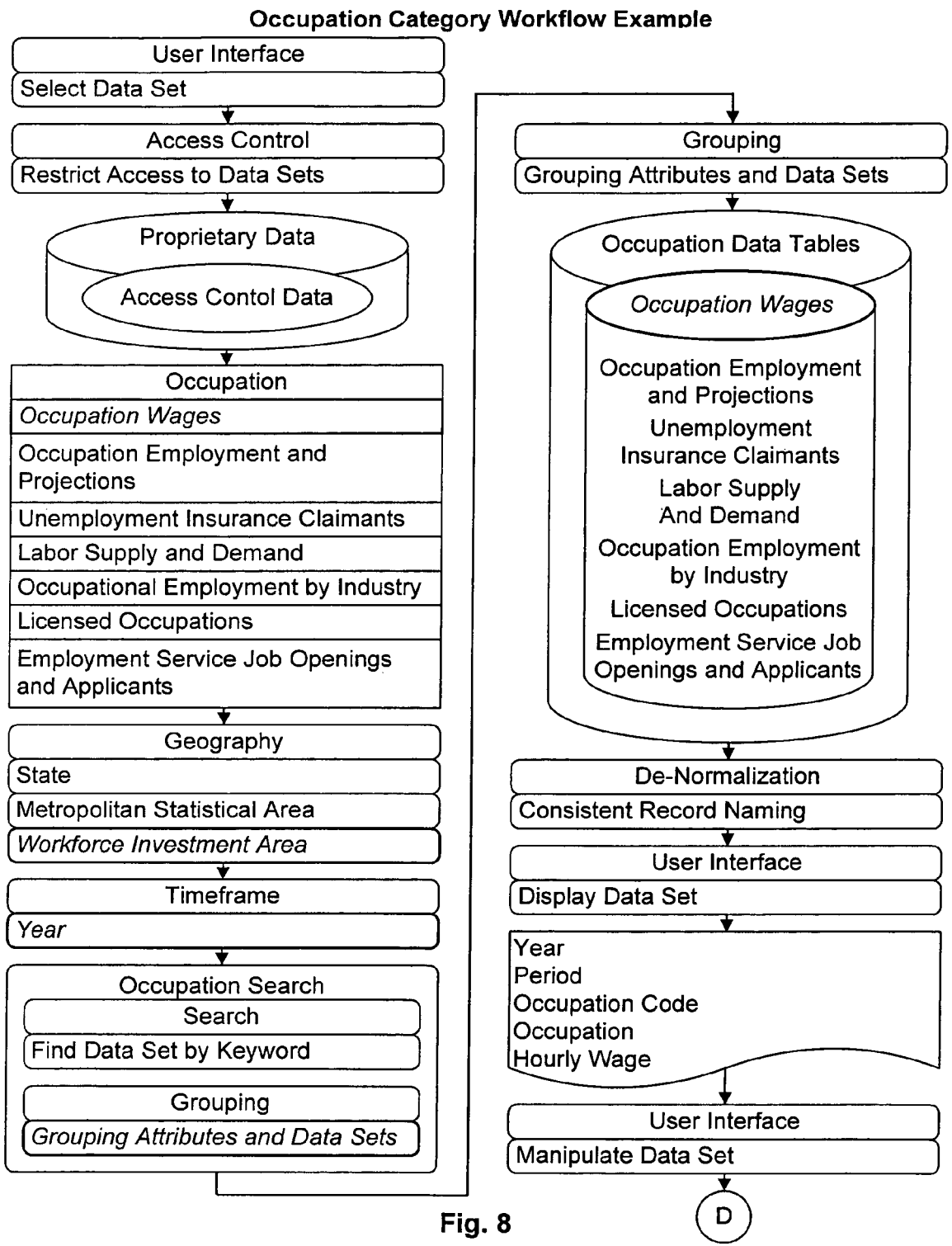
FIG. 8 is an occupation category workflow example showing an operative description of analyzing labor market information.
Figure 9:
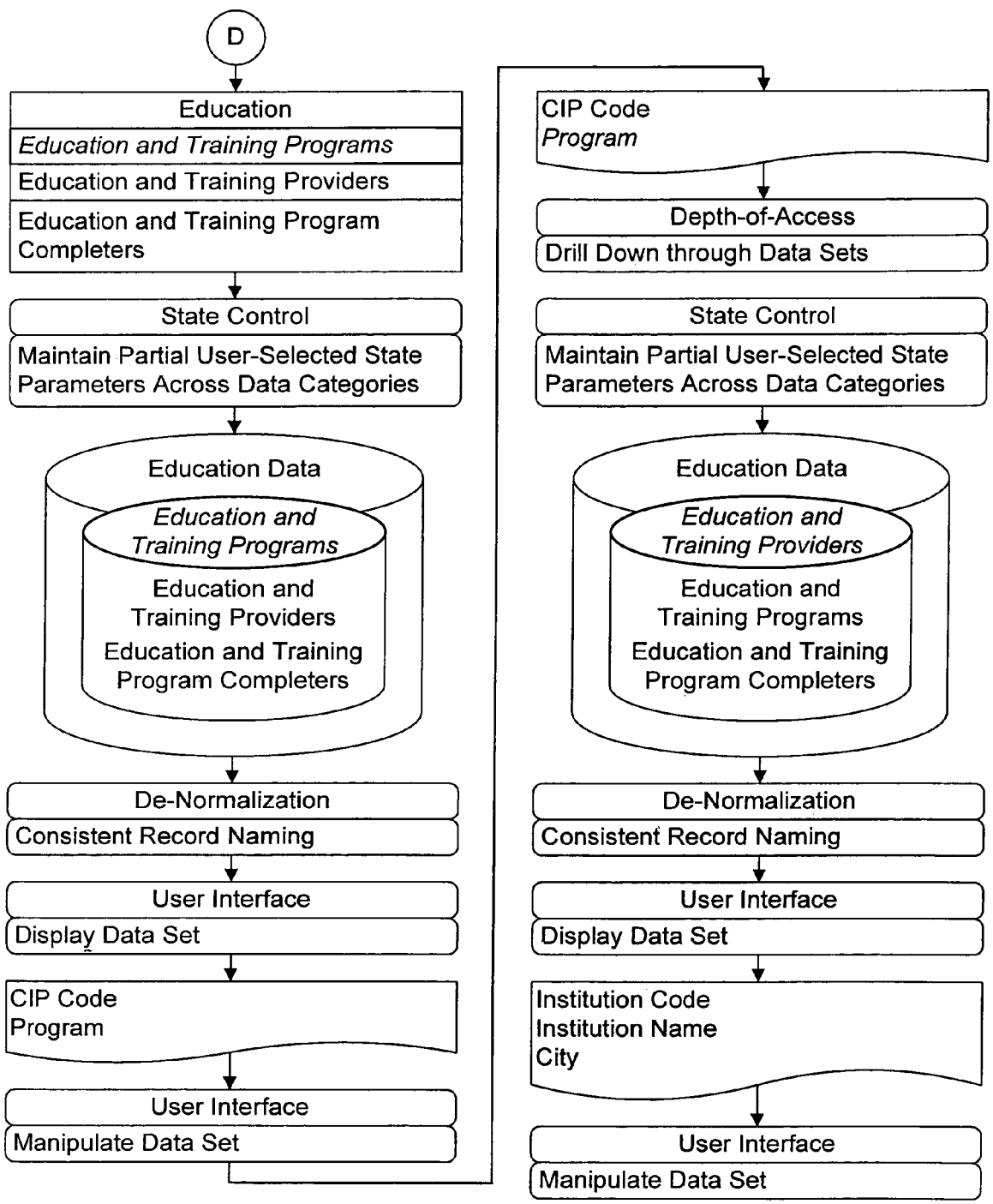
FIG. 9 is a state control and depth-of-access workflow example showing an operative description of analyzing labor market information.
Figure 10:
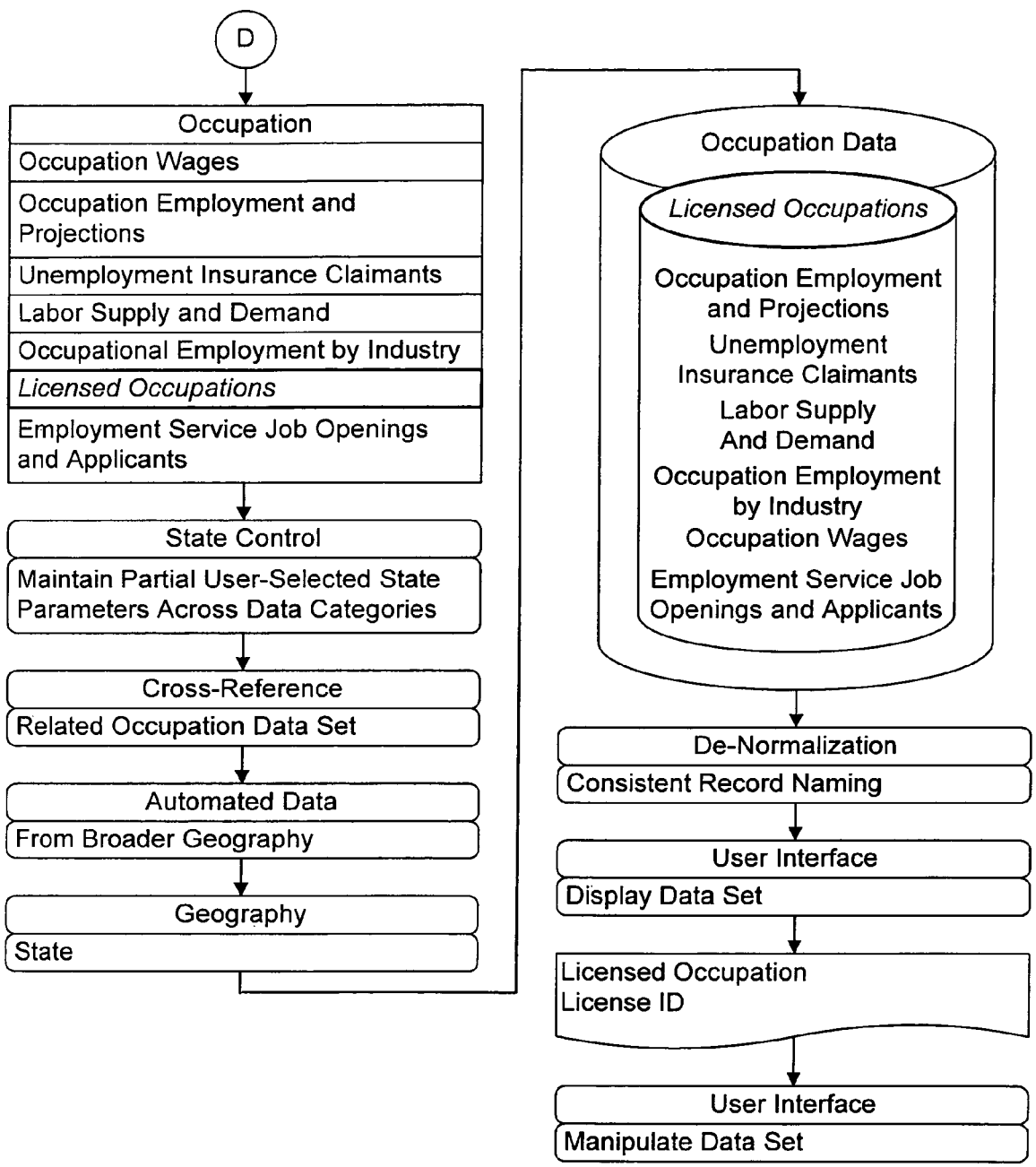
FIG. 10 is a cross-reference and automated data workflow example showing an operative description of analyzing labor market information.

With reference now to the drawings, and in particular to FIG. 1 thereof, the preferred embodiment of the new and improved computerized information system for analyzing labor market information embodying the principles and concepts of the present invention and generally designated by the reference numeral 10 will be described.

The present invention, a computerized information system for analyzing labor market information 10 is comprised of a client 12 operatively coupled to a server 14 running a plurality of software components operatively coupled to a database 72 containing a plurality of data. Software components in their broadest context include categorizing components 16 and processing components 18 comprising: a plurality of categorizing components 16 including area profile 20, economic indicators 22, education 24, employer 26, income and wages 28, industry 30, labor force 32, occupation 34, and population and census 36 and a plurality of processing components 18 including access control 40, automated data 42, cross-reference 44, de-normalization 46, demographic 48, depth-of-access 50, economic projections 52, education 54, export 56, geography 58, grouping 60, income 62, search 64, state control 66, timeframe 68, and user-interface 70. Such components are individually configured and correlated with respect to each other so as to attain the desired objective. To provide comparative data, at least two of these components are used in a query.

A computerized information system for analyzing labor market information 10 is used by researchers, job seekers, employers, staff, and others and allows all users to analyze labor market information through a single user interface 70. For example, a job seeker looking to relocate to a specific geographic area can search for a combination of employers 26 and income 62 to determine if he/she is a good match for that geography.

The server 14 has a plurality of categorizing components 16 including area profile 20, economic indicators 22, education 24, employer 26, income and wages 28, industry 30, labor force 32, occupation 34, and population and census 36. To provide comparative data, at least two of these categorizing components are used in a typical query. For example, a job seeker can find the educational opportunities 24 and wage information 28 of a geographical area to help decide if relocation is feasible. The same job seeker can also see what occupational areas 34 are available and information regarding population and census 36 to determine if the area is growing.

The area profile component 20 consists of a plurality of data sets including history or background 20A, population 20B, income 20C, labor force statistics 20D, unemployment insurance claimants 20E, and unemployment wages 20F

The economic indicators component 22 consists of a plurality of data sets including building permits 22A, tax revenue 22B, property values 22C, retail sales 22D, and inflation and price index 22E.

The education component 24 consists of a plurality of data sets including education and training programs 24A, education and training providers 24B, and education and training completers 24C.

The employer component 26 consists of a plurality of data sets including employer listing by industry 26A and employer listing by occupation 26B.

The income and wages component 28 consists of a plurality of data sets including income 28A, occupation wages 28B, covered employment wages 28C, and U.S. census labor force 28D.

The industry component 30 consists of a plurality of data sets including current employment statistics 30A, covered employment wages 30B, industry employment and projections 30C, and staffing patterns 30D.

The labor force component 32 consists of a plurality of data sets including labor force employment and unemployment 32A, unemployment insurance claimants 32B, labor supply and demand 32C, education and training completers 32D, employment service job openings and applicants 32E, and U.S. census commuting patterns 32F.

The occupation component 34 consists of a plurality of data sets including occupation wages 34A, occupation employment and projections 34B, unemployment insurance claimants 34C, labor supply and demand 34D, occupational employment by industry 34E, licensed occupations 34F, employment service job openings and applicants 34G.

The population and census component 36 consisting of a plurality of data sets including population 36A, income 36B, occupation by race and gender 36C, and U.S. census labor force 36D.

The server 14 also having a plurality of processing components 18 including access control 40, automated data 42, cross-reference 44, de-normalization 46, demographic 48, depth-of-access 50, economic projections 52, education 54, export 56, geography 58, grouping 60, income 62, state control 64, search 66, timeframe 68, and user-interface 70.

The access control component 40 consisting of a plurality of processing objects including restrict access to data sets 40A and restrict access to display options 40B.

The automated data component 42 consists of a plurality of processing objects providing data from a broader geography 42A, from a broader timeframe 42B, and from a broader user-specified criteria 42C. The cross-reference component 44 consisting of a plurality of processing objects providing data from related industry data set 44A, related occupation data set 44B, and related education data set 44C.

The de-normalization component 46 consists of a processing object providing consistent record naming 46A. The demographic component 48 consists of a plurality of processing objects including ethnicity 48A, gender 48B, and other demographic data 48C.

The depth-of-access component 50 consisting of a plurality of processing objects providing drill down through data sets 50A and drill up through data sets 50B. The economic projections component 52 consists of processing objects providing future projections of appropriate data 52A.

The education component 54 consists of a plurality of processing objects providing type of educational institution 54A, education programs 54B, and education program completers 54C.

The export component 56 consists of a plurality of processing objects including save data set to spreadsheet format 56A and save data set to delimited text 56B.

The geography component 58 consists of a plurality of processing objects including national 58A, state 58B, county 58C, metropolitan statistical areas 58D, wage region 58E, planning region 58F, other statistical area 58G, and staff-defined geographies 58H.

The grouping component 60 consists of a plurality of processing objects including grouping attributes and data sets 60A, and ungrouping attributes and data sets 60B.

The income component 62 consists of a processing object providing type of income 62A. The search component 64 consists of a processing object to find data set by keyword 64A.

The state control component 66 consists of a plurality of processing objects including maintain all user-selected state parameters across data categories 66A and maintain partial user-selected state parameters across data categories 66B.

The timeframe component 68 consists of a plurality of processing objects including year 68A, quarter 68B, month 68C, and other date range 68D.

The user interface component 70 consists of a plurality of processing objects including select data set 70A, display data set 70B, and manipulate data set 70C.

The present invention includes a database 72 of standard format data 74 including America's Labor Market Information System (ALMIS) format and other standard formats, and proprietary format data 76 optionally running stored procedures 78 to manage data. The database includes a plurality of data categories including access control data 80, demographic data 82, economic data 84, education data 86, industry data 88, and occupation data 90. The database 72 is operatively coupled with the server 14 for the two way communication of information.

The present invention further includes a plurality of input/output client devices 12 such as personal computers operatively coupled with the server 14 for the two way communication of information. This coupling can be a direct connection, a dial-up connection, a local area network or a wide area network such as the Internet. The plurality of client devices allows access from researchers, employers, staff, and others by providing labor market information analysis through a single user interface.

The present invention overcomes the problems and disadvantages of the prior art by providing labor market information analysis of demographic, economic, education, industry, and occupation data. The system ensures that the ability to analyze specific data is available to all users through a single user interface. Anyone with access to the Internet will be able to access the system. The system can provide analysis to users who might find it inconvenient to visit a physical location to barriers, such as lack of transportation, disability, or other barriers.

To enable broader access to labor market information analysis, the system can be equipped with interfaces specifically designed for blind or low vision users, Spanish-speaking users, and additional languages as required by the user community.

Data is stored in the ALMIS database structure defined by the U.S. Department of Labor's Employment and Training Administration. As such the system is able to share labor and economic data available from federal, state, and local agencies throughout the United States.

The present invention provides labor market information analysis using the latest three-tier system architecture. This structure eliminates the need for field deployment of applications to the user. The only access requirement is an Internet browser. All operations will be performed on the server side.

The present invention analyzes labor market information using a state-of-the-art delivery system providing functions via the Internet. It provides a total integration of the labor market information analysis in a way that allows staff and users of different skills and educational levels to use the system. Under current labor market information initiatives, local systems are envisioned as components of a larger regional, state, and national system. The present invention provides this function in one system since it will be based on a standard structure and integrates directly into systems such as America's Labor Market Information System (ALMIS) at the state and federal levels.

The present invention implements an adaptable labor market information analysis solution built from a software component library, permitting the system to be customized to the exact needs of state, regional, and local boards and agencies. The system can also be easily modified to meet changes in business rules and regulations and incorporate enhancements.

The present invention significantly improves labor market information analysis performance and user satisfaction by providing a common core of information and easy access to key analysis services, the system will dramatically increase the quality of service provided by the boards and agencies. The result will be a significant increase in user access to labor market information analysis. The system's easy and effective mechanisms will connect a larger pool of researchers, employers, staff and others, and deliver overall improved labor market information analysis.

The present invention significantly improves labor market information analysis by serving a significant number of users via a single easy-to-use interface. The system effectively bridges the gap between users needing labor market information analysis the data stored in different standard and proprietary formats.

The present invention provides unlimited use as an Internet/Intranet solution. There is no limit to the number of users who can access the system. Any authorized users, provided they have Internet access, can access the system from any location, or from a computer at the physical location of the labor market information analysis center.

The present invention analyzes open and non-proprietary data from existing state and federal standard databases. The system analyzes data stored in the America's Labor Market Information System (ALMIS) database structure defined by the U.S. Department of Labor's Employment and Training Administration. Any organization using the system can share the wealth of labor and economic data available from federal, state, and local agencies throughout the United States.

The present invention improves user choice by giving users options critical to a labor market information analyzer system. Researchers, employers, staff, and others will have choices in how and where they can obtain information and analysis, and will have access to the information needed to research and compile data from labor market information analysis.

As to the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A labor market information analyzer system for access and display of labor market data, the system comprising:
    a server;
    a database of standard data and proprietary data operatively coupled to the server;
    software running on the server, the software accessing data from both the database of standard data and proprietary data and generating categorized data by at least two categories selected from the group consisting of education, employer, population and census, income and wage, industry, labor force, occupation, area profile and economic indicators; and
    a plurality of input/output client devices operatively coupled to the server, the input/output clients interfaced to the server to access the categorized data;
    wherein the income and wage category includes a plurality of software components providing at least one data from the group consisting of income, occupation wages and covered employment wages.

2. The labor market information analyzer system of claim 1, wherein the standard data in the database is from the America's Labor Market Information System (ALMIS) database provided by the U.S. Department of Labor.

3. The labor market information analyzer system of claim 1, wherein the proprietary data stored in the database includes access control data.

4. The labor market information analyzer system of claim 1, whereas the plurality of input/output client devices allow access from users selected from the group consisting of job seekers, researchers, employers and staff.

5. The labor market information analyzer system of claim 1, wherein the education category including a plurality of software components providing information selected from the group consisting of education and training program information, education and training provider information and education and training program completer information.

6. The labor market information analyzer system of claim 1, wherein the employer category includes a plurality of software components providing information by on of the group consisting of employer listing by industry and employer listing by occupation.

7. The labor market information analyzer system of claim 1, wherein the population and census category includes a plurality of software components providing at least one data from the group consisting of population, income, occupation by race and gender and U.S. Census labor force.

8. The labor market information analyzer system of claim 1, wherein the industry category includes a plurality of software components providing data from at least one of the group consisting of current employment statistics, covered employment and wages, industry employment and projections and staffing patterns.

9. The labor market information analyzer system of claim 1, wherein the labor force category includes a plurality of software components providing data from at least one of the group consisting of labor force employment and unemployment, unemployment insurance claimants, labor supply and demand, education and training completer information, employment service job opening and applicant information and U.S. Census commuting patterns.

10. The labor market information analyzer system of claim 1, wherein the occupation category includes a plurality of software components providing data from at least one of the group consisting of occupation wages, occupation employment and projections, unemployment insurance claimants, labor force supply and demand, occupational employment by industry, licensed occupations and employment service job openings/applicants.

11. The labor market information analyzer system of claim 1, wherein the area profile category includes a plurality of software components providing data from at least one of the group consisting of history, background, population, income, labor force statistics, unemployment insurance claimants and unemployment wages.

12. The labor market information analyzer system of claim 1, wherein the economic indicators category includes a plurality of software components providing data from at least one of the group consisting of building permits, tax revenues, property values, retail sales and an inflation and price index.

13. A labor market information analyzer system for access and display of labor market data, the system comprising:
    a server;
    a database of standard and proprietary industry data operatively coupled to the server;
    software running on the server accessing data from the standard industry data and the proprietary industry data and generating categorized data by categorizing the data by at least two categories selected from the group consisting of education, employer, population and census, income and wage, industry, labor force, occupation, area profile and economic indicators, the server further comprising:
        the education category including a plurality of software components providing information selected from the group consisting of education and training program information, education and training provider information, and education and training program completer information;
        the employer category including a plurality of software components providing employer listing by industry and employer listing by occupation;
        the population and census category including a plurality of software components providing at least one data from the group consisting of population, income, occupation by race and gender and U.S. Census labor force;
        the income and wage category including a plurality of software components providing at least one data from the group consisting of income, occupation wages and covered employment wages;
        the industry category including a plurality of software components providing data from at least one of the group consisting of current employment statistics, covered employment and wages, industry employment and projections and staffing patterns;
        the labor force category including a plurality of software components providing data from at least one of the group consisting of labor force employment and unemployment, unemployment insurance claimants, labor supply and demand, education and training completer information, employment service job opening and applicant information and U.S. Census commuting patterns;

the occupation category including a plurality of software components providing data from at least one of the group consisting of occupation wages, occupation employment and projections, unemployment insurance claimants, labor force supply and demand, occupational employment by industry, licensed occupations, and employment service job openings and applicants;

the area profile category including a plurality of software components providing data from at least one of the group consisting of history, background, population, income, labor force statistics, unemployment insurance claimants and unemployment wages; and the economic indicators category including a plurality of software components providing data from at least one of the group consisting of building permits, tax revenues, property values, retail sales, and an inflation and price index; and a plurality of input/output client devices operatively coupled to the server for accessing the categorized data, the plurality of input/output client devices configured to access the categorized data by job seekers, researchers, employers, and staff.

14. A labor market information analyzer system for access and display of labor market data, the system comprising:
a server;
a means for accessing standard data and proprietary data, the means for accessing operatively coupled to the server;
a plurality of software components, the software components accessing the standard data and the proprietary data and a means for generating categorized data from the standard data and the proprietary data by at least two categories selected from the group consisting of education, employer, population and census, income and wage, industry, labor force, occupation, area profile and economic indicators;
a means for communicating with a plurality of input/output client devices; the means for communicating providing the categorized data to the input/output clients, the means for communicating operatively coupled to the server;
wherein the income and wage category includes a plurality of software components providing at least one data from the group consisting of income, occupation wages and covered employment wages.

15. The labor market information analyzer system of claim 14, wherein the means for accessing standard data includes a means to access the America's Labor Market Information System (ALMIS) database provided by the U.S. Department of Labor.

16. The labor market information analyzer system of claim 14, wherein the education category including a plurality of software components providing information selected from the group consisting of education/training program information, education/training provider information and education/training program completer information.

17. The labor market information analyzer system of claim 14, wherein the employer category includes a plurality of software components providing employer listing by industry and employer listing by occupation.

18. The labor market information analyzer system of claim 14, wherein the population and census category includes a plurality of software components providing at least one data from the group consisting of population, income, occupation by race/gender and U.S. Census labor force.

19. The labor market information analyzer system of claim 14, wherein the industry category includes a plurality of software components providing data from at least one of the group consisting of current employment statistics, covered employment and wages, industry employment/projections and staffing patterns.

20. The labor market information analyzer system of claim 14, wherein the labor force category includes a plurality of software components providing data from at least one of the group consisting of labor force employment and unemployment, unemployment insurance claimants, labor supply and demand, education and training completer information, employment service job opening and applicant information and U.S. Census commuting patterns.

21. The labor market information analyzer system of claim 14, wherein the occupation category includes a plurality of software components providing data from at least one of the group consisting of occupation wages, occupation employment and projections, unemployment insurance claimants, labor force supply and demand, occupational employment by industry, licensed occupations, and employment service job openings and applicants.

22. The labor market information analyzer system of claim 14, wherein the area profile category includes a plurality of software components providing data from at least one of the group consisting of history, background, population, income, labor force statistics, unemployment insurance claimants and unemployment wages.

23. The labor market information analyzer system of claim 14, wherein the economic indicators category includes a plurality of software components providing data from at least one of the group consisting of building permits, tax revenues, property values, retail sales, and an inflation and price index.

* * * * *